Dec. 2, 1952 P. L. ALSPAUGH ET AL 2,620,386
EARTH STRATA CUTTING INDICATOR
Filed Jan. 12, 1950 2 SHEETS—SHEET 2
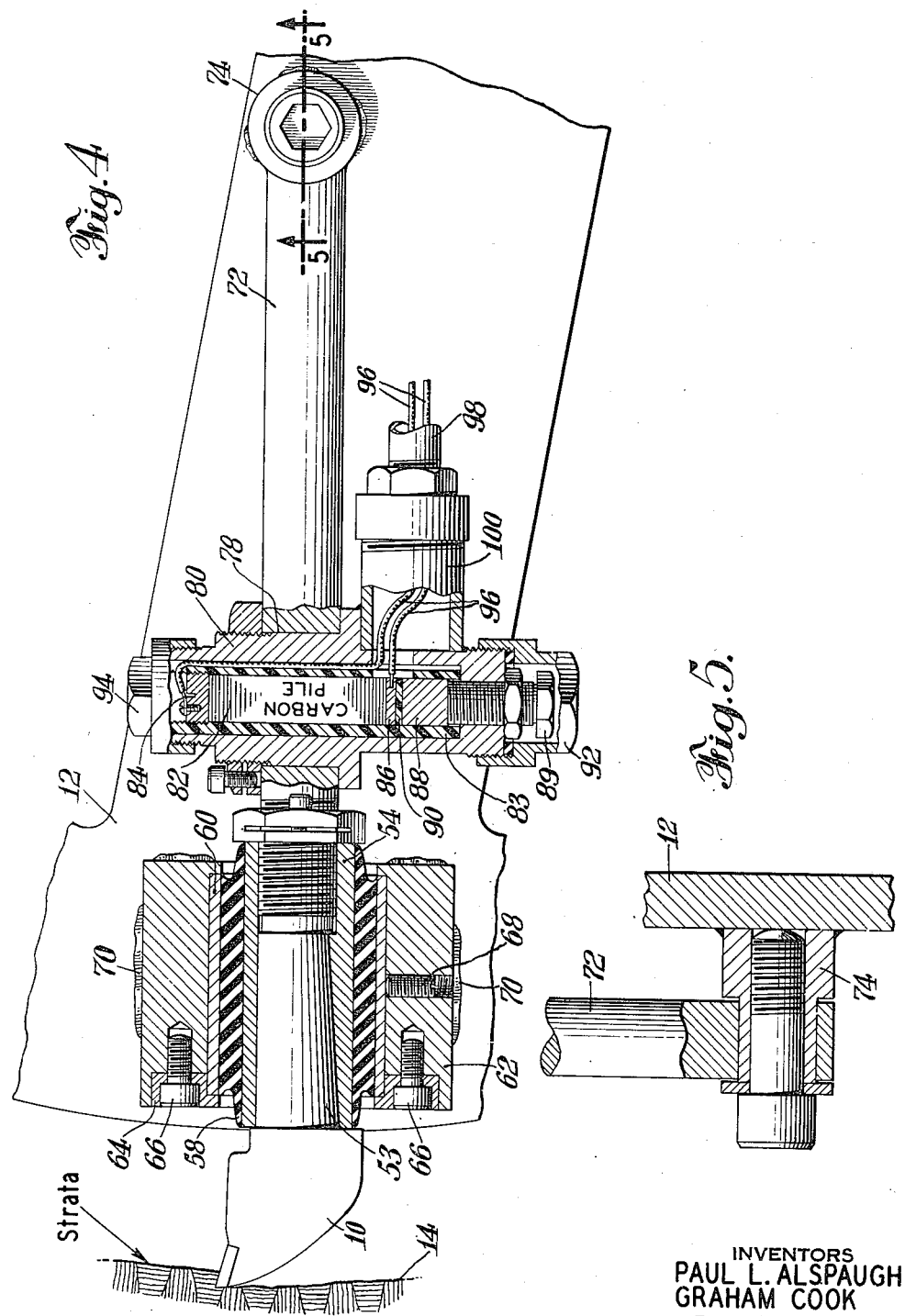
INVENTORS
PAUL L. ALSPAUGH
GRAHAM COOK
BY D. C. Harrison
ATTORNEY Patented Dec. 2, 1952

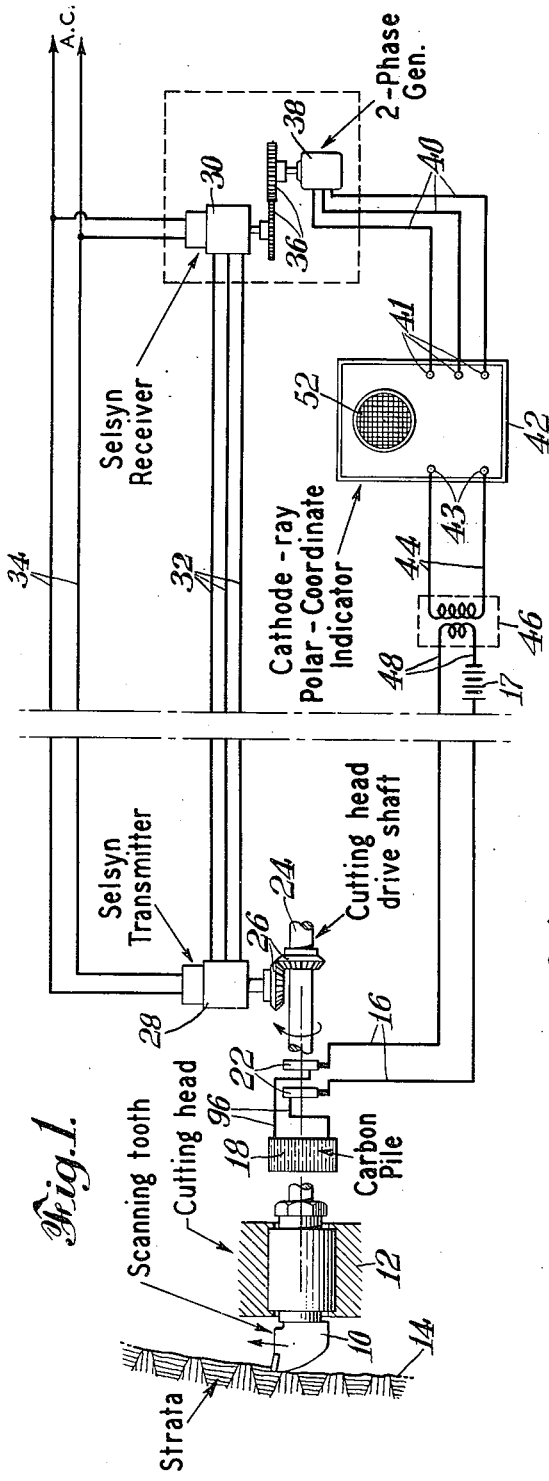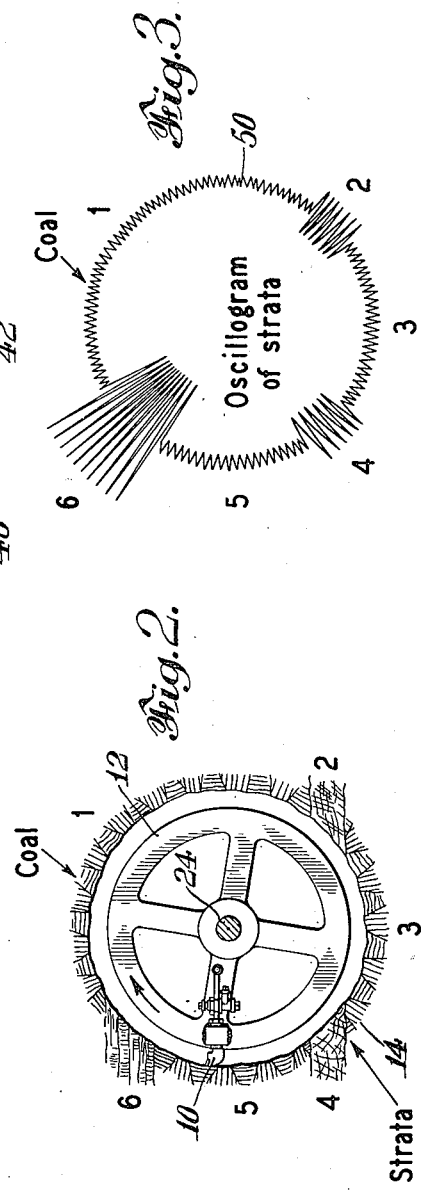

2,620,386

UNITED STATES PATENT OFFICE 2,620,386

EARTH STRATA CUTTING INDICATOR

Paul L. Alspaugh and Graham Cook, South Charleston, W. Va., assignors to Union Carbide and Carbon Corporation, a corporation of New York Application January 12, 1950, Serial No. 138,148

7 Claims. (Cl. 177—311)

This invention relates to earth strata indicators or stratascopes, and more particularly to a continuously-indicating strata cutting-scanning system.

In the operation of a horizontal boring machine for mining coal, for example, it is important to keep the machine in a layer of coal and out of adjacent strata of rock, if possible, by remote control. In order to do so, it is necessary to know the nature of the strata in which the machine is boring while the machine is in operation. This is difficult due to the vibration and underground location of the machine itself in cutting several different strata at the same time.

The main object of this invention is to provide an automatic strata indicator or scope for a bore mining machine, hereinafter referred to as the "machine," which continuously indicates at a location remote therefrom the nature of the material of each and all of the strata being cut thereby while the machine is in operation underground, which indicator is free of any interference trouble due to operational vibration of the machine itself. Another object is to provide a pickup which is suitable for such use. Other objects will appear in the following description.

According to the invention, there is provided a strata indicator comprising the combination with a rotary cutting head, of an actual strata cutting and scanning tooth mounted in such head so that the tooth rotates therewith and cuts the face of the strata being cut by the head, resulting in characteristic vibrations of the tooth which correspond to the particular formation of each of the strata cut by the tooth in its rotation with the head. Such cutting vibrations are converted to electrical signals in a circuit including a suitable pickup which also is mounted on the head. Such circuit is coupled to an indicator such as a cathode-ray, polar-coordinate oscilloscope so that the signals are visibly indicated on the screen thereof. A synchronizing system is also provided between the cutting head and indicator, which synchronizes the circular time base of the oscilloscope with the circular motion of the scanning tooth as it cuts the strata face.

The pickup is designed and arranged so that it is responsive substantially only to vibrational movement in line with the forces acting on the tooth in cutting; thus eliminating undesirable general vibration of the cutting head from the signal circuit. As a result, the screen of the oscilloscope furnishes at a convenient station remote from the machine, a visual indication of the different strata actually being cut at the time by the head, so that the machine can be guided by manipulation of suitable remote control means also located at such station, to cut in a desired layer of coal, for example.

In the drawings:

Fig. 1 is a circuit diagram of a system illustrating the invention;

Fig. 2 is a fragmentary view, partly in front elevation and partly in section, of the cutting head in operation;

Fig. 3 is an oscillogram of the strata of Fig. 2, as indicated on the screen of the oscilloscope;

Fig. 4 is a view, partly in elevation and partly in cross section, of the scanning tooth pickup unit; and Fig. 5 is a fragmentary sectional view taken on line 5—5 of Fig. 4.

As shown in the drawings, a strata scanning cutting tooth 10 is carried by a rotary cutting head 12 of a horizontal boring machine for mechanically mining substrata material 14. Cutting vibrations of the tooth 10 are translated into electrical signals in a circuit 16 containing a battery 17, by a carbon-pile pickup 18 which is also carried by the head 12. The pickup is mechanically connected to the tooth 10, and electrically connected in the circuit 16 by brush-slip ring contact means 22 associated with the drive shaft 24 of the cutting head 12.

The shaft 24 is connected by a 1:1 ratio gearing 26 to drive a selsyn transmitter or self-synchronous generator 28. The latter is electrically connected to a selsyn receiver or self-synchronous motor 30 by a three-wire cable 32. The selsyn transmitter and receiver are connected to a suitable power line or source of A. C. by a circuit 34. The selsyn motor 30 is connected by a 1:1 ratio gearing 36 to drive a 90°-phased two-phase generator 38 having an output circuit 40 connected to the circular time base input terminals 41 of an oscilloscope or cathode-ray, polar-coordinate indicator 42.

The signal input terminals 43 of the oscilloscope 42 are connected to the output circuit 44 of a signal amplifying and impedance matching transformer 46 having its input circuit 48 connected in the signal circuit 16. Thus, even though the oscilloscope 42 is located at a station remote from that of the cutting head 12, the resulting oscillogram 50 on the screen 52 of the oscillograph 42 continuously indicates the nature of each of the strata 1—6 being cut at the time by the tooth 10.

The scanning tooth 10 has a rather sharp cutting edge so that as such cutting edge engages and cuts successive strata, the resulting vibrations are transmitted to the carbon-pile pickup 18, which has a small electrical current of suitable amperage and voltage flowing through it by virtue of the battery 17. The resulting alternate compression and expansion of the carbon pile alters its electrical resistance, and thereby alters the electrical current passing through it. The amplitude and frequency of such current alterations are proportional to the amplitude and frequency of vibration of the scanning tooth. The resulting fluctuations in electrical current are transmitted through the slip ring arrangement 22 to the remote indicating point, where they are converted into the desired visual effect on the cathode ray tube of the oscilloscope 42.

As shown in Figs. 2 and 3, for example, the stratoscope continuously indicates on the screen 52 the pattern 50 which represents the strata being cut at the time by the tooth 10, consisting of coal 1, bone coal 2, coal 3, bone coal 4, coal 5, and snake rock 6, for example. By watching the pattern 50 the operator can guide the direction of the machine so that it mines the desired material, in this case coal, to the best advantage.

The tooth 10 is mounted so as to attain a suitable vibratory deflection under the pressures encountered, the mounting being sufficiently rugged to withstand the conditions encountered in continuous duty. The pickup must transmit a signal large in comparison to background electrical "noise" or any spurious signal, so as to present a clear picture of the actual tooth signal on the screen of the cathode-ray tube. The novel scanning tooth pickup unit shown in Figs. 4 and 5 has proven satisfactory in actual bore mining.

As shown in greater detail by Figs. 4 and 5, the cutting tooth 10 has a tapered shank 53 fitted into a metal sleeve 54. The sleeve 54 is bonded to a tubular rubber mounting member 58 which is, in turn, bonded to the inside of a metal tube 60. The tube is mounted in a hollow bracket 62, being held in place therein by a retaining ring 64 secured to the bracket by screws 66. A set screw 68 threaded in a lateral hole in the bracket 62 also engages and helps hold the tube 60 in place in the bracket. The bracket 62 is welded to one side of the head 12 at 70.

The so rubber-mounted tooth 10 is axially supported by an arm 72, the outer end of which is threaded and inserted in the sleeve 54 back of the shank 53, and the inner end of which is pivoted to the head at 74 near the hub thereof. Thus, the arm 72 is free to rotate about pivot 74, to the extent that the rubber mount of the tooth 10 permits. Arm 12 stops any inward movement of the tooth 10. The arm 72 contains a transverse hole 78 in which is mounted a cartridge 80 containing a carbon pile 82. The carbon pile 82, consisting of a number of carbon discs, is supported by a shell 83 of insulating material fitted in the cartridge 80 and also supporting a fixed terminal 84 at one end of such pile, an axially movable terminal 86 at the other end thereof, and an axially movable plug or slug 88.

The plug 88 and the terminal 86 are separated by an axially movable insulating disc 90. The carbon pile is adjusted by adjusting a screw 89 which is threaded through one end of the cartridge and engages one end of the plug 88. The ends of the cartridge are closed by cap-nuts 92 and 94. Insulated wires 96 are connected to the terminals 84 and 86, respectively, and to the slip rings 22; the wires being protected by a conduit 98 which is connected at one end to an outlet bushing 100 on the cartridge 80.

Thus, only actual cutting vibrations of the tooth 10 are transmitted to the carbon pile 82 as the head 12 rotates, by virtue of the inertia of the plug 88 which is axially movable to compress and release the carbon pile 82 at right angles to the longitudinal axis of the arm 72 in accordance with such vibrations.

In its principal application to remote indication of the scanning action of the tooth as the cutter head advances into the coal or other strata, the electrical vibrations or signals are transmitted to the radial amplitude posts 43 of the polar-coordinate oscilloscope 42 which operates on a circular time base. The circular time base is synchronized with the circular motion of the scanning tooth on the cutting head, so that the vibrations cause radial deflections of the electron beam striking the cathode-ray tube face, as the electron beam sweeps in a circle at a speed governed exactly by the speed of the cutting head.

The invention thus provides at a remote point a visible indication of the nature of the strata actually being cut by the machine. The amplitude, and to some extent the frequency of the scanning tooth vibration, varies as the hardness of the material engaged. Therefore, different materials, such as coal, bone coal, shale, sandstone, snake rock, etc. show marked variations in their effect on the amplitude and/or the frequency of the vibration, so that there is provided at such remote point, a continuous picture of the strata engaged by the machine cutter head. Such picture can be observed for purposes of machine control. Also, it may be photographed for purposes of record, if desired.

We claim:

1. A stratascope for continuously indicating the strata actually being cut at the time by a bore mining machine having a rotary cutting head, comprising a strata cutting tooth mounted on said head, means responsive substantially only to the strata cutting vibrations of said tooth, means indicating such vibrations in synchronism with the rotation of said head, and means acting to maintain synchronism between such indicating means and such rotation of the cutting head.

2. An earth strata cutting indicator for continuously picturing at a remote station the different strata being cut at the time by a boring machine, comprising the combination with a rotary cutting head provided with an actual cutting tooth mounted on such head for rotation therewith, of means translating the resulting vibratory deflections of said tooth as it actually cuts through strata of different hardness into electrical signals, an oscilloscope having a circular time base, means applying such signals to the input circuit of said oscilloscope, and means synchronizing the circular sweep of the cathode-ray of said oscilloscope with the rotation of said cutting head, whereby the screen of the oscilloscope portrays during the boring operation a picture of the face being cut in which the different strata are defined by radial oscillations corresponding to the amount of deflection of said cutting tooth due to the cutting force thereof.

3. An earth strata cutting indicator comprising the combination with a rotary cutting head, of a strata cutting and scanning tooth mounted in such head so as to cut the strata which is being cut by the head, resulting in characteristic vibrations of the tooth which correspond to each of the strata being cut by the tooth in its rotation with the head, means converting such cutting vibrations into electrical signals, means transmitting such signals to a point remote from the head, means receiving the signals at such point, said receiving means having a strata indicator responsive to such signals which continuously indicates the nature of the strata being cut by said tooth, and means synchronizing the operation of said indicator with that of said head.

4. An earth strata cutting indicator comprising the combination with a rotary cutting head, of a strata cutting and scanning tooth mounted in such head so as to cut the strata which is being cut by the head, resulting in characteristic movements of the tooth which correspond to each of the strata being cut by the tooth in its rotation with the head, means converting such movements into electrical signals, means transmitting such signals to a point remote from the head, means receiving the signals at such point, said receiving means having a strata indicator responsive to such signals which continuously indicates the nature of the strata being cut by said tooth, and means synchronizing the operation of said indicator with that of said head.

5. An earth strata hardness indicator comprising the combination with a rotary cutting head, of a strata cutting and scanning tooth mounted in such head, resulting in characteristic movements of the tooth which correspond to the relative hardness of each of the strata being cut by the tooth in its rotation with the head, means converting such movements into electrical signals, means transmitting such signals to a point remote from the head, means receiving the signals at such point, said receiving means having a strata hardness indicator responsive to such signals which continuously indicates the relative hardness of the strata being cut by said tooth, and means synchronizing the operation of said indicator with that of said head.

6. A stratascope for continuously indicating the strata actually being cut at the time by a bore mining machine having a rotary cutting head comprising a lever having one end thereof attached to a pivot on said cutting head, said pivot being substantially perpendicular to the plane of rotation of said cutting head, said lever extending in a direction substantially parallel to the plane of rotation of said cutting head; a strata cutting tooth rigidly mounted on the end of said lever remote from the pivoted end thereof; a bracket rigidly affixed to said cutting head; a resilient member mounted between said bracket and said lever and resiliently retaining said lever within said bracket; a pickup connected to said lever and adapted to vary its electrical resistance in response to vibration of said lever; an electrical circuit including a power supply, said pickup, and an indicator responsive to variations in the electrical resistance of said pickup; and means synchronizing the operation of said indicator with that of said head, said means comprising a generator, the output current of which is responsive to the rotation of said cutting head, a second circuit including said generator and said indicator which converts the current from said generator to a signal bearing a fixed relation to the position of said cutting head.

7. A stratascope as claimed in claim 6 wherein said pickup comprises a carbon pile, a movable plug responsive to the vibrations of said lever to compress and release said carbon pile.

PAUL L. ALSPAUGH.
GRAHAM COOK.

REFERENCES CITED

The following references are of record in the file of this patent:

UNITED STATES PATENTS

| Number | Name | Date |
|---|---|---|
| 2,402,773 | Rogatz | June 25, 1946 |
| 2,436,047 | Martin | Feb. 17, 1948 |
| 2,460,246 | Vacha | Jan. 25, 1949 |